(12) United States Patent
Sakagawa et al.

(10) Patent No.: US 6,278,202 B1
(45) Date of Patent: Aug. 21, 2001

(54) POWER SUPPLY CIRCUIT AND A DISK DRIVE DEVICE PROVIDED WITH THE POWER SUPPLY CIRCUIT

(75) Inventors: Masahiro Sakagawa; Akihiro Ohshita, both of Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/296,964

(22) Filed: Apr. 22, 1999

(30) Foreign Application Priority Data

Jul. 22, 1998 (JP) .................................................. 10-206328

(51) Int. Cl.[7] .................................................... H02J 7/34
(52) U.S. Cl. .............................................. 307/72; 307/46
(58) Field of Search ................................. 307/72, 46, 64, 307/66

(56) References Cited

U.S. PATENT DOCUMENTS

| | | | |
|---|---|---|---|
| 4,401,895 | * | 8/1983 | Petkovsek ............................. 307/66 |
| 5,610,450 | * | 3/1997 | Saeki et al. ............................ 307/46 |
| 5,615,129 | * | 3/1997 | Stich et al. ........................... 364/492 |
| 5,629,602 | * | 5/1997 | Makino ..................................... 320/6 |

FOREIGN PATENT DOCUMENTS 8-140286    5/1996   (JP) .

* cited by examiner

*Primary Examiner*—Fritz Fleming
(74) *Attorney, Agent, or Firm*—Dike Bronstein, Roberts & Cushman IP Group of Edwards & Angell, LLP; David G. Conlin; David A. Tucker

(57) ABSTRACT

To reduce a power loss and elongate the service life of a battery in a power supply circuit for a widely variable power-consuming load. In a device with a dry battery and a rechargeable battery, the rechargeable battery supplies the power while its output voltage is higher than a 3.4V-voltage increased voltage by a voltage increasing circuit. When the output voltage of the rechargeable battery decreases lower than 3.4V, the voltage increasing circuit operates and the dry battery works as a power supply. The power voltage increased by the voltage increasing circuit through a choke coil is fed to respective voltage decreasing circuits. The current is also fed to recharge the rechargeable battery when the output voltage of the choke coil is higher than the output voltage of the rechargeable battery. When the load is increased by the operation of a pickup, the power stored in the rechargeable battery together with the power from the dry battery after increased to 3.4 V by the voltage increasing circuit is supplied to respective voltage decreasing circuits.

7 Claims, 9 Drawing Sheets

POWER SUPPLY CIRCUIT AND A DISK DRIVE DEVICE PROVIDED WITH THE POWER SUPPLY CIRCUIT

BACKGROUND OF THE INVENTION

The present invention relates to a power supply circuit and a disk drive provided with the power supply circuit.

A typical example of a conventional power supply circuit for supplying electric power to a largely variable power-consuming load is a power supply circuit used for disk drives capable of storing and retrieving information held on disk media.

Referring to FIGS. 1 to 3, the conventional power circuit used for a portable type MD (magnetic disk) recording and reproducing device will be described below.

In FIGS. 1 to 3, there is shown a recording and reproducing means 1 composed of a pickup, a pickup servo, a pickup drive and radio-frequency amplifier, which writes data on a disk by a high-power laser beam generated by the pickup and reads data from a disk by a micro-power laser beam generated therefrom.

There is shown a signal processing circuit 2 for transferring data from and to the recording and reproducing means 1 and processing the data by companding (compressing and expanding), which circuit includes a memory 2a in which data compressed when recording by the signal processing circuit 2 and compressed data read from the disk are stored. While the data is compressed and stored by the signal processing circuit 2 with the memory 2a, the pickup has nothing to do and, therefore, stops emission of a laser beam to the disk and the pickup servo and the drive also stop. This realizes a considerable saving in electric power since the load while the pickup halts is smaller than a half of the load while the pickup being in operation.

Numeral 3 denotes a microcomputer for control of an entire system of the MD recording and reproducing device and numeral 4 denotes a signal converting circuit whereby data input through an input terminal is converted from analog to digital and transferred to the signal processing circuit 2 and data output from the signal processing circuit 2 is converted from digital to analog and transferred to an output terminal.

A first voltage increasing/decreasing circuit 5a (up-down type DC-DC converter) 5a is used for increasing or decreasing a voltage from a power supply circuit (to be described later) to 2.5 volts and a second voltage increasing/decreasing circuit (up-down type DC-DC converter) 5b is used for increasing and decreasing a voltage from the power supply circuit (to be described later) to 2.8 volts. The first voltage increasing/decreasing circuit (DC-DC converter circuit) 5a is connected to a circuit requiring the power supply of 2.5 volts while the second voltage increasing/decreasing circuit (DC-DC converter circuit) 5b is connected to a circuit requiring the power supply of 2.8 volts. The decreasing or increasing of voltage transferred from the power supply circuit (to be described later) is needed because the voltage may not be constant and is more and less than a required value.

There is also shown a dry battery 6a, a rechargeable battery 6b capable of charging and discharging and an AC adapter 6c for converting an alternating current to a direct current. These components are selectively attached and detached by a user of the device. The magnitudes of the output voltages of the respective power sources, i.e., the AC adapter 6c, the rechargeable battery 6c and the dry battery 6a become smaller in the described order. The dry battery 6a are inserted in a battery case 10 as illustrated in FIGS. 2A, 2B and the battery case 10 is then fitted at its male terminals in corresponding female terminals of the device body 20 as illustrated in FIG. 3. The battery case 10 is electrically connected to the device body 20 by turning a tightening screw. Because current from the dry battery 6a is constant in line to the first DC-DC converter circuit 5a and the second DC-DC converter circuit 5b, power loss due to resistance of a transmission line from the dry battery 6a to a load cannot be neglected.

Switches 7a, 7b and 7c are used for turning on the power supply from the dry battery 6a, the rechargeable battery 6b and the AC adapter 6c respectively. The switches 7a, 7b, 7c are turned on and off according to control signals of the microcomputer 3 to transmit the power to the first DC-DC converter circuit 5a, the second DC-DC converter circuit 5b and a voltage increasing circuit 8 to be described later. The switches 7a, 7b and 7c may be of, e.g., a power MOSFET (metal-oxide-semiconductor transistor) having small on-resistance.

Diodes 7d, 7e, 7f are disposed in parallel with the switches 7a, 7b, 7c respectively. When any of the power sources was disconnected by the user, another power supply whose output voltage is next in magnitude to that of the removed power supply is selected to output a voltage through the diode corresponding to the selected power supply.

A voltage increasing circuit 8 is used for increasing an input voltage to 2.8 volts. This circuit is connected to the switches 7a, 7b and 7c respectively and can receive power from the dry battery 6a, the rechargeable battery 6b and the AC adapter 6c. The power from the dry battery 6a is increased to 2.8 volts and further transmitted. On the other hand, the power generated by the rechargeable battery 6b or the AC adapter 6c is transmitted without being increased since the output voltage is higher than 2.8 volts.

A voltage decreasing circuit 9 is used for decreasing the power voltage fed from the voltage increasing circuit 8 to 2.5 volts that is then used for driving the microcomputer 3. The voltage increasing circuit 8 and the voltage degreasing circuit 9 is provided to drive the microcomputer 3 first without fail when a start (power) key (not shown) of the MD recording and reproducing device is turned on. Namely, the first voltage increasing and decreasing circuit 5a is controlled by the microcomputer 3 and, therefore, it cannot drive the microcomputer 3.

In the above-described MD recording and reproducing device, the microcomputer 3 is unconditionally driven when a start key (not shown) on the device is turned on, and it recognizes the power sources attached to the device body by measuring voltage of each power supply and selects one of the attached power sources according to the priority in the order of the AC adapter 6c, the rechargeable battery 6b and the dry battery 6a. The microcomputer 3 then turns on a switch (7a, 7b or 7c) corresponding to the selected power supply to transmit power therefrom to the device. The microcomputer 3 determines the output voltage of the power supply when the output increases and when data is written or read by the device, compares the measured voltage with a warning level and a life-end level preset for each power supply mode and gives a warning indicating the battery approaching to the life end level or stops the power supply mode when its output reaches the life end level.

The warning voltage level of a dry battery 6a when writing data on a disk is 1.0 volts and its life-end level is 0.9 volts. The warning level of the battery 6a when reading data from a disk is 1.0 volts and the life-limit level is 0.8 volts. The warning level and the life-limit level of the battery 6a for the writing operation are set higher than those for the reading operation. This is because the load during the recording operation is higher than the load during the reproducing operation and, furthermore, the data recording operation is not completed by writing main data on a magnetic disk (MD) and continues until UTOC (User Table Of Contents) data relating to the main data is recorded in a UTOC area. Namely, the recording operation requires additional power energy for writing UTOC data for all the main data written during the operation.

The above-described conventional device involves the following drawbacks:

1. The microcomputer may have a hang-up or a dead halt.

When the device was de-energized by eventually disconnecting a power supply during the operation of the device, the microcomputer turns on a switch of a next designated power supply to immediately start the supply of power through a diode for protecting the voltage from dropping in the meantime. However, there may still be a risk of hanging-up of the microcomputer from the voltage drop across the diode if the output of the next designated power supply should be at the life-end level.

2. The power supply circuit is very expensive.

A relay type switch cannot be used for applications where high-speed switching is required. A bipolar type transistor switch requires a base current associated with a power loss and is unsuited to use in applications where power saving is desired. Consequently, power MOSFET switches being drivable with a potential applied thereto are necessarily used for the MD recording and reproducing device. However, the power MOSFET switch having small on-resistance is very expensive and must be provide done for each of the respective power supply circuits. The use of plural expensive switches irrevocably increases the manufacturing cost of the device.

3. The power supply circuit has a large loss of power.

Although a power MOSFET switch having a less power loss is applied, it has still a negligible power loss due to on-resistance in particular when operating under a large load. This serves as an obstacle to realizing the power-saving device. When the device is powered from a power supply consisting a small number of dry batteries, it is necessary to provide a voltage increasing-decreasing circuit consisting of an up-down type DC-DC converter for increasing the output voltage to the level preset for the load to prevent the output voltage from dropping lower than the level required by the load. In this case, a power loss in a voltage decreasing circuit is about 10% of the power while a power loss in a voltage increasing-decreasing circuit is about 30%. Namely, the power supply circuit has a large power loss.

A dry battery power supply may be used with a voltage decreasing circuit only but requires in this case the use of at least four dry batteries. The use of increased number of dry batteries is of course unfavorable.

4. The operation life of a dry battery is short.

A dry battery is selected to power the device when the AC adapter is not attached to the device and the rechargeable battery is attached but has a decreased output lower than the preset level. In this instance, a charge in the rechargeable battery cannot be used and the battery power supply must work only with a large external load, so the battery may quickly reach the life-end level because of the large loss of the charge caused in the power supply circuit and an increased drop of its voltage caused due to an increased internal resistance of the battery.

5. A plurality of dry batteries must be used.

The output voltage drop of a dry battery may arise from increasing internal resistance (not due to the starting voltage drop). Since the internal resistance increases with an increase in the external load, the output of the battery may quickly decrease to the life-end level. It is therefore required to use an increased number of dry batteries to elongate the operation time of the device. This is unfavorable in particular for portable type devices.

SUMMARY OF THE INVENTION

An object of the present invention is to provide a power supply circuit capable of preventing a hang-up of the microcomputer, minimizing the power loss and elongating the operation life of the battery.

Another object of the present invention is to provide a power supply circuit for supplying electric power to a widely variable power-consuming load, which comprises a first DC power supply having a recharging facility and a second DC power supply having an internal resistance higher than that of the first DC power supply and which is featured by the construction that a voltage increasing means is provided for increasing an output voltage of the second DC power supply to a specified value, a DC resistance is disposed between the voltage increasing means and the load, the first DC power supply is connected in a connection circuit between the DC resistance and the load, the first DC power supply and the second DC power supply are connected in parallel combination to the load and the first DC power supply is capable of supplying a voltage higher than a voltage increased by the voltage increasing means.

The power supply circuit according to the above mentioned invention can supply electric power from the second DC power supply to the device when working under a light load, giving a charge from the second power supply to the first power supply by the effect of the voltage increasing means when working under the light load, and can also supply the electric power from the recharged first DC power supply to an increased load by increasing a current from the first DC power supply larger than a current from the second power supply by the effect of the DC resistance to the device.

Another object of the present invention is to provide a power supply circuit characterized in that the DC resistance is composed of a coil having DC resistance.

The power supply circuit according to the above mentioned invention can remove a ripple component produced by the voltage increasing means by giving a reactance component to the DC resistance.

Another object of the present invention is to provide a power supply circuit characterized in that the first DC power supply has a property showing a sharp change in its output voltage according to charging power in a state just before consuming all remaining charge and the voltage increasing means increases the output voltage of the second DC power supply to the level of the output voltage of the first DC power supply in the state just before consuming all remaining charge.

With the power supply circuit according to the above mentioned invention, it is possible to use the first DC power supply having a property showing a sharp change in its output voltage according to a charge in a state just before consuming all remaining charge, increase the output voltage of the second DC power supply by the voltage increasing means to the level of the output voltage of the first DC power supply in the state just before consuming all remaining charge and switch over the power supply from the first DC power supply to the second DC power supply. This makes it possible to use full power of the first DC power supply when it is alternated with the second DC power supply and to instantaneously increase the output voltage of the first DC power supply even if the period of working under the light load was short.

Another object of the present invention is to provide a power supply circuit characterized in that the first DC power supply is capable of supplying a voltage higher than a load voltage required by the load and the voltage increasing means is capable of increasing the output voltage of the second DC power supply higher than a voltage required by the load.

The power supply circuit according to the above mentioned invention can use a voltage decreasing means as the voltage converting means for obtaining a voltage equal to the level required by the load since the output voltage of the second DC power supply is increased higher than a voltage required by the load.

A further object of the present invention is to provide a disk drive device capable of storing data in and retrieving data from disk media by repeating the pickup operation with a pause, which comprises a first DC power supply having a charging facility, a second DC power supply having an internal resistance higher than that of the first DC power supply, a voltage increasing means for increasing an output voltage of the second DC power supply to a specified value and a DC resistance disposed between the voltage increasing means and a pickup driving circuit, wherein the first DC power supply is connected in a connection circuit between the DC resistance and the pickup driving circuit, the first and second DC power sources are connected in parallel with the pickup driving circuit and the first DC power supply is capable of supplying a voltage higher than a voltage increased by the voltage increasing means.

The disk drive device according to the above mentioned invention can charge the first DC power supply with electric energy from the second DC power supply by the effect of the voltage increasing means, supplying electric power from the second DC power supply to the pickup driving circuit for a halt period of the pickup, and can also cause the first DC power supply to supply the power stored during the light load period to the device with an increased load by increasing a current from the first DC power supply larger than a current from the second power supply by the effect of the DC resistance, maintaining the supply of electric power from the second DC power supply to the pickup driving circuit.

A further object of the present invention is to provide a disk drive device characterized in that the second DC power supply and the voltage increasing means form a separate power-supply unit that can be detachably attached to the disk drive device.

The disk drive device according to the above mentioned invention is provided with a separate detachable power-supply unit composed of the second DC power supply and the voltage increasing means, thereby the value of current in the line from the power supply to the load can be reduced.

PREFERRED EMBODIMENTS OF THE INVENTION

The preferred embodiments of the present invention will be described below in detail with reference to accompanying drawings.

Figure 4:
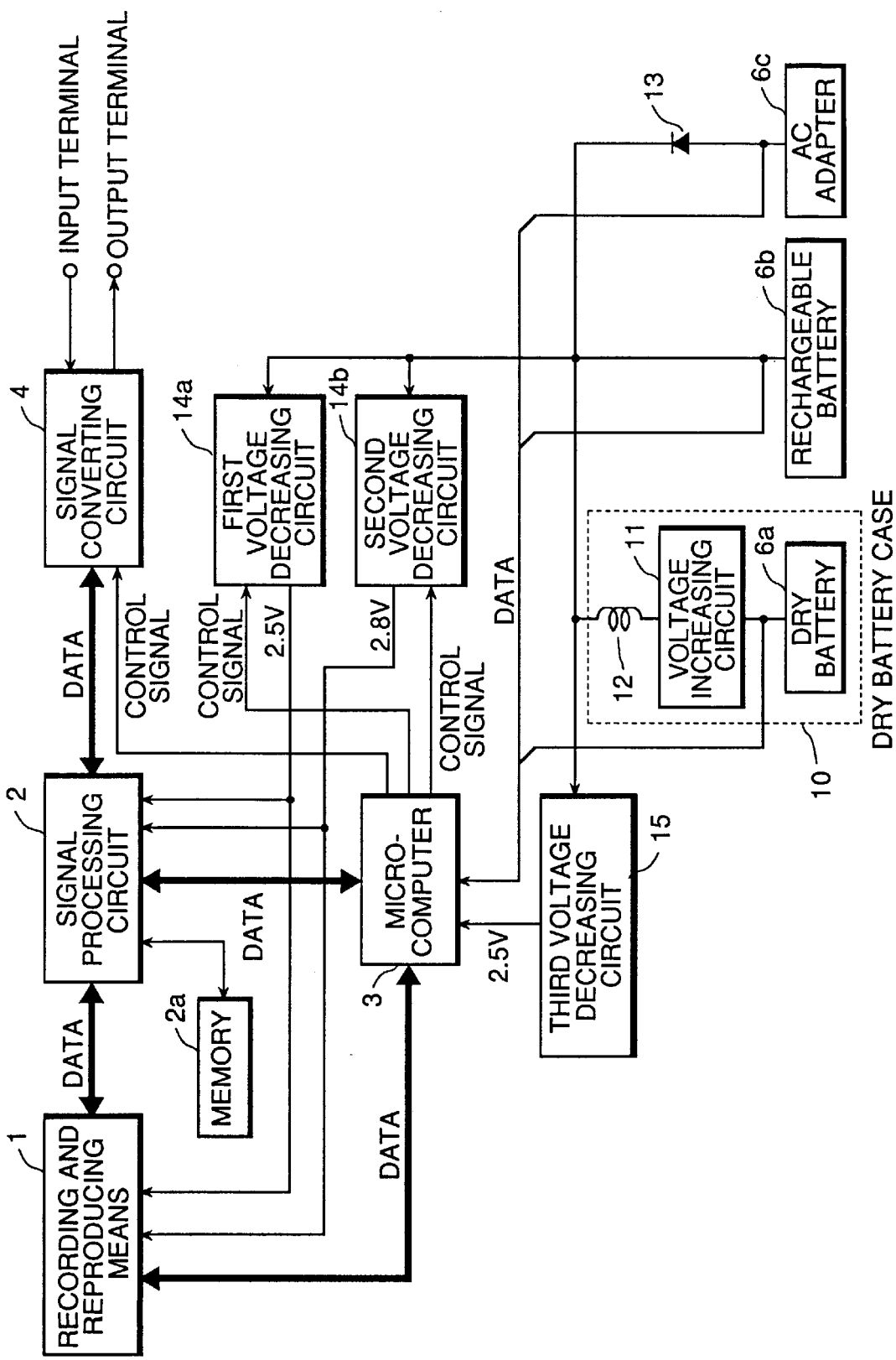
FIG. 4 is a schematic block diagram showing an electrical construction of a disk drive which is an embodiment of the present invention.
Figure 5A:
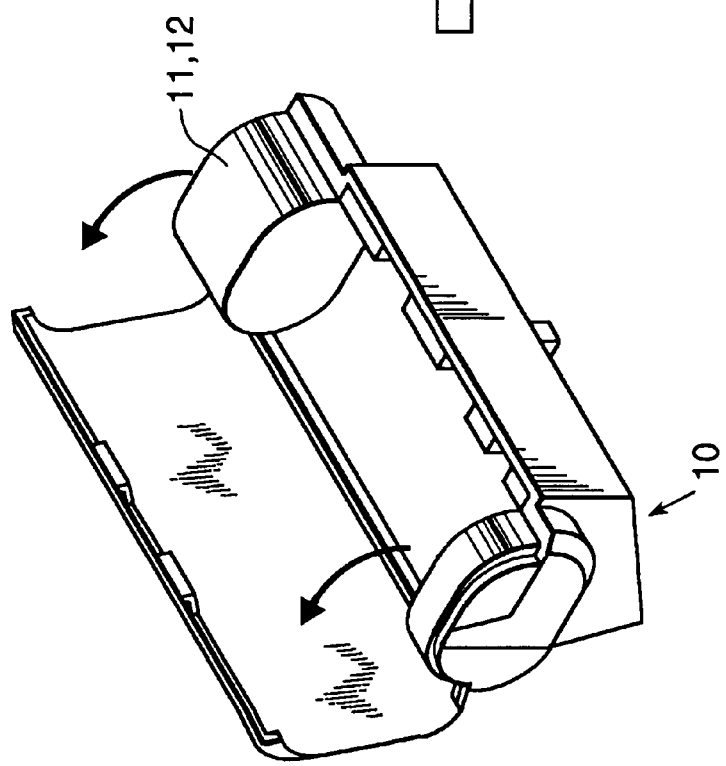
FIGS. 5A and 5B are external perspective views of a power supply unit used for the disk drive of FIG. 4, where the unit is shown in the states before and after a dry battery is mounted therein respectively.
Figure 5B:
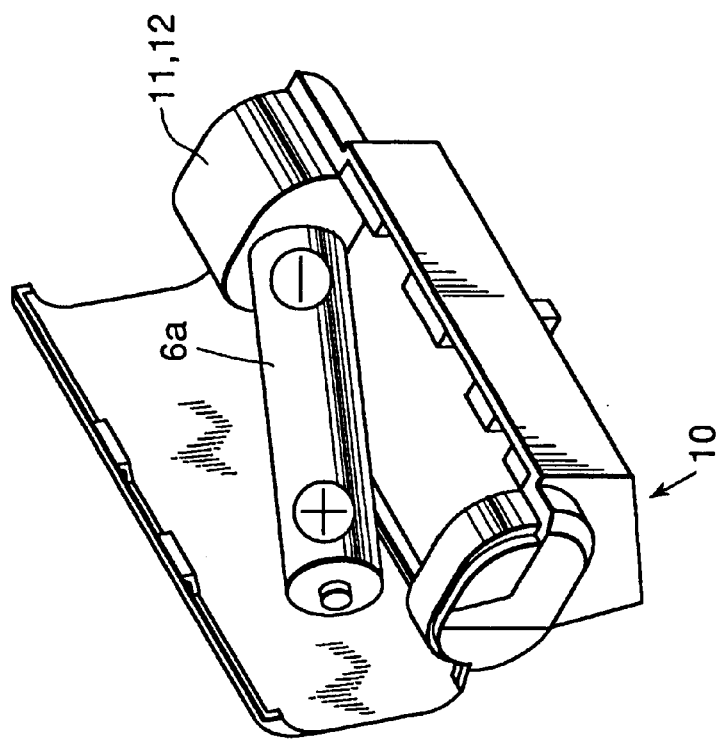
Figure 6:
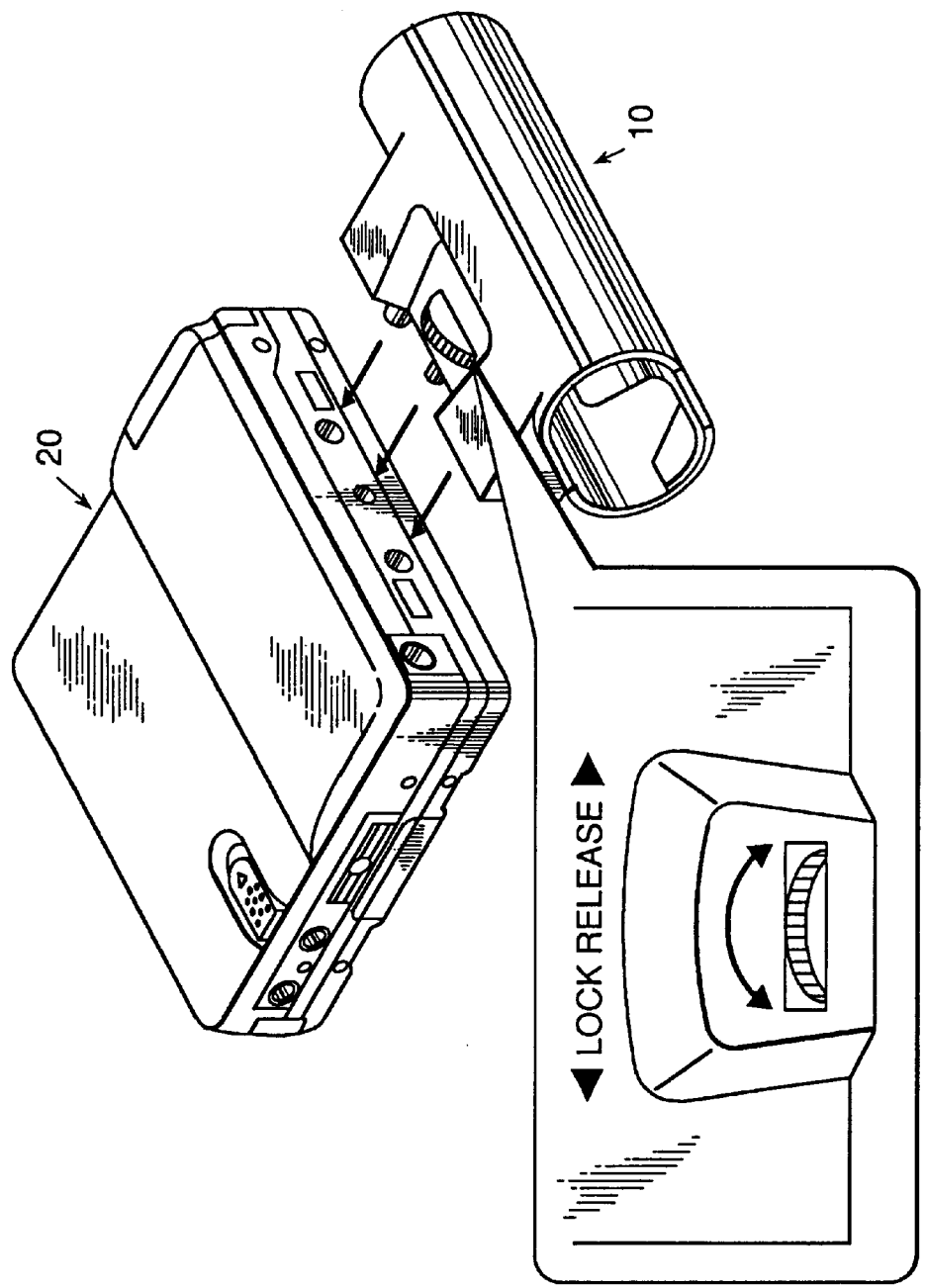
FIG. 6 is an external perspective view of the power supply unit of FIGS. 5A and 5B when it is attached to the disk drive body shown in FIG. 4.

FIG. 4 is a schematic functional block diagram showing an electrical construction of a disk drive embodying the present invention. FIGS. 5A and 5B are perspective external views of the disk drive before and after a battery is mounted therein respectively. FIG. 6 is an external perspective view of the power supply unit of FIGS. 5A and 5B when it is attached to the disk drive of FIG. 4.

Figure 7:
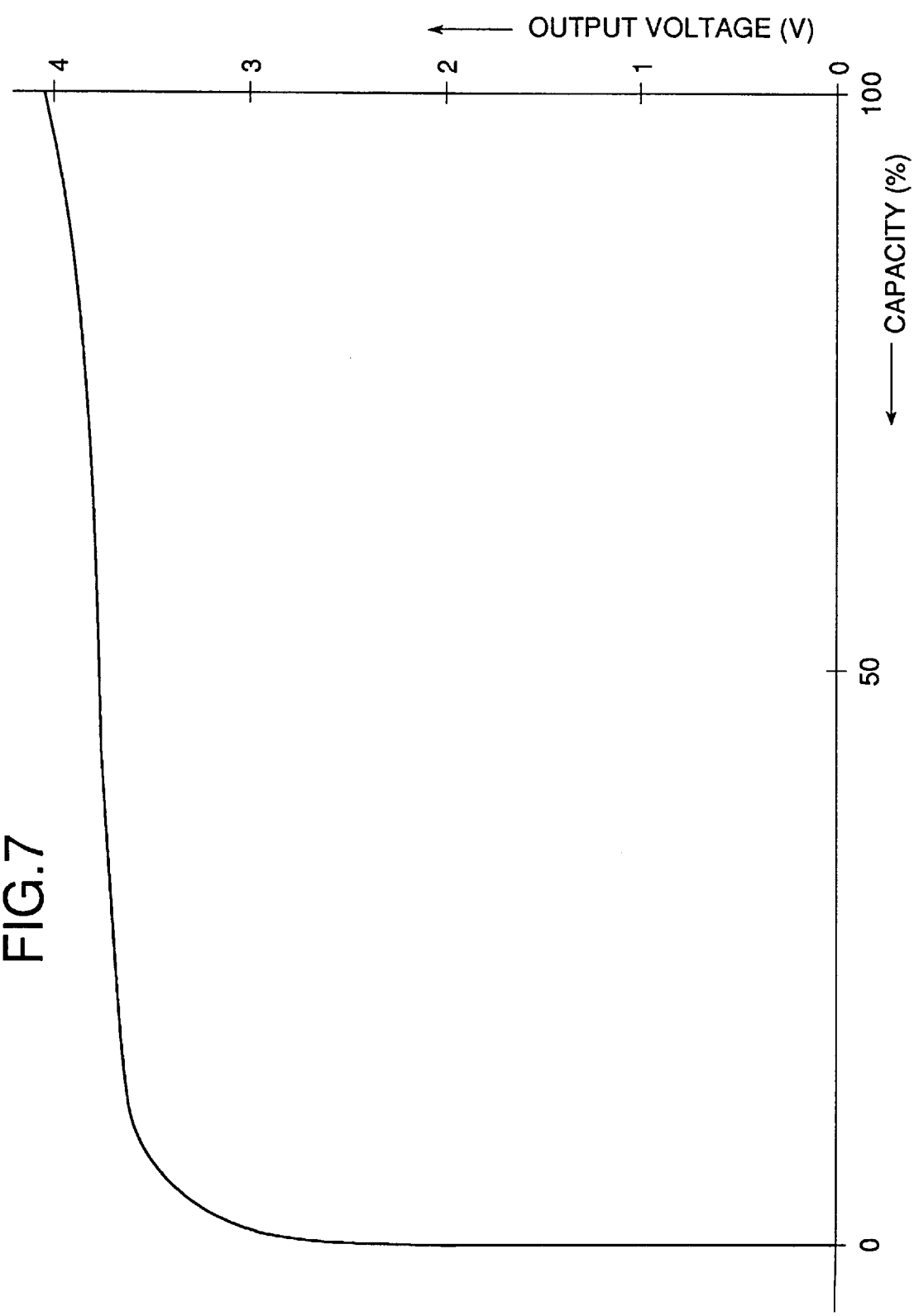
FIG. 7 is illustrative of characteristic curves showing a relationship between the output voltage and the charging/discharging power of a rechargeable battery used in the disk drive of FIG. 4.

FIG. 7 is illustrative of characteristic curves showing a relationship between an output voltage and a charging/discharging power of a rechargeable battery used in the disk drive of FIG. 4.

Figure 8:
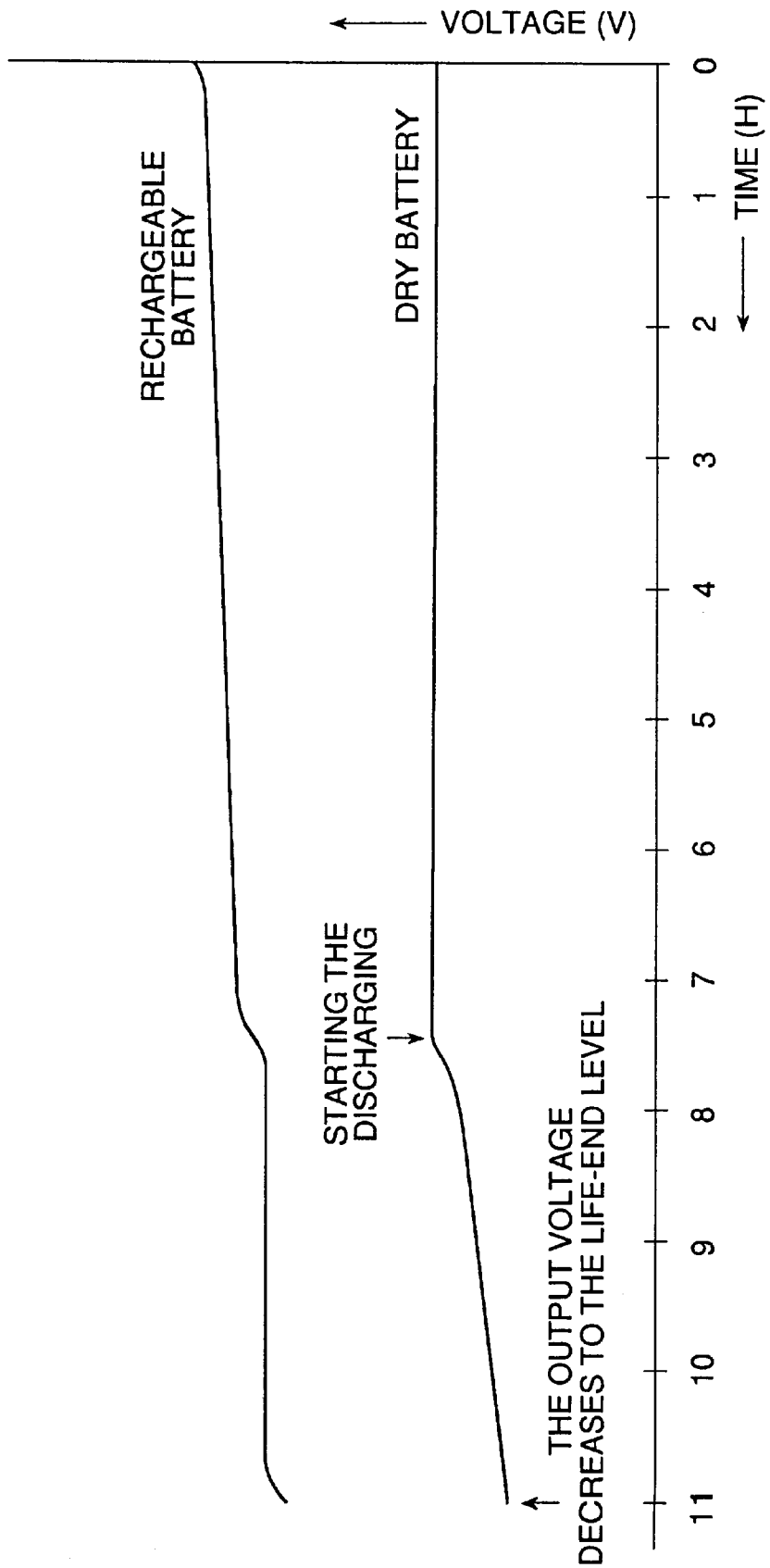
FIG. 8 is illustrative of typical characteristic curves showing a relationship between a time, a rechargeable battery voltage and a dry battery voltage when the disk drive with the full charged rechargeable battery and the dry battery conducted continuous recording of information in a disk medium.

FIG. 8 is illustrative of typical characteristic curves showing a relationship between a time, a rechargeable battery voltage and a dry battery voltage, which data were obtained when the disk drive with the full charged rechargeable battery and the dry battery conducted continuous recording of information in a disk medium.

Figure 9:
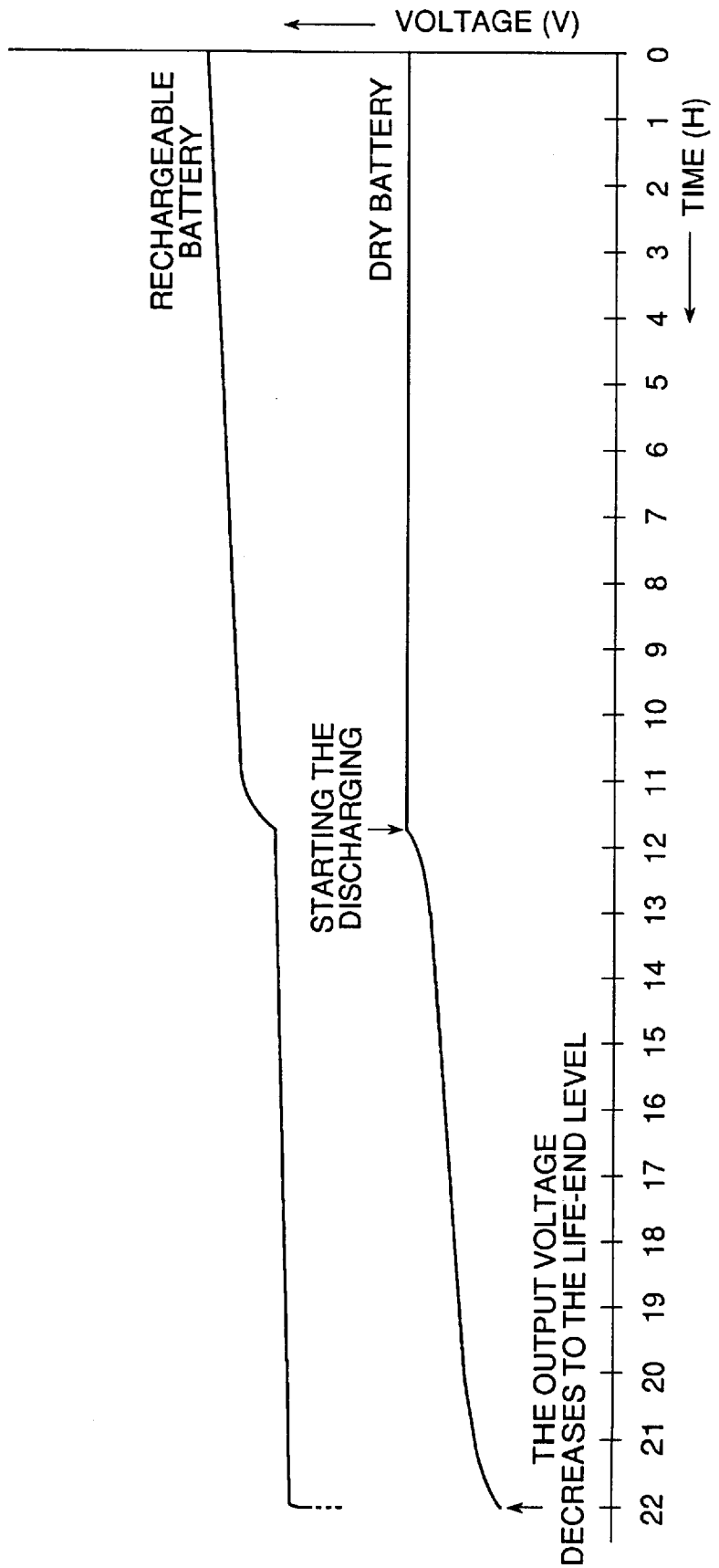
FIG. 9 shows typical characteristics of relationship between a time, a rechargeable battery voltage and a dry cell voltage when the disk drive with the full charged rechargeable battery and the dry battery conducted continuous reproduction of information from a disk medium.

FIG. 9 is illustrative of typical characteristic curves showing a relationship between a time, a rechargeable battery voltage and a dry cell voltage, which data were obtained when the disk drive with the full charged rechargeable battery and the dry battery conducted continuous reproduction of information from a disk medium.

Figure 1:
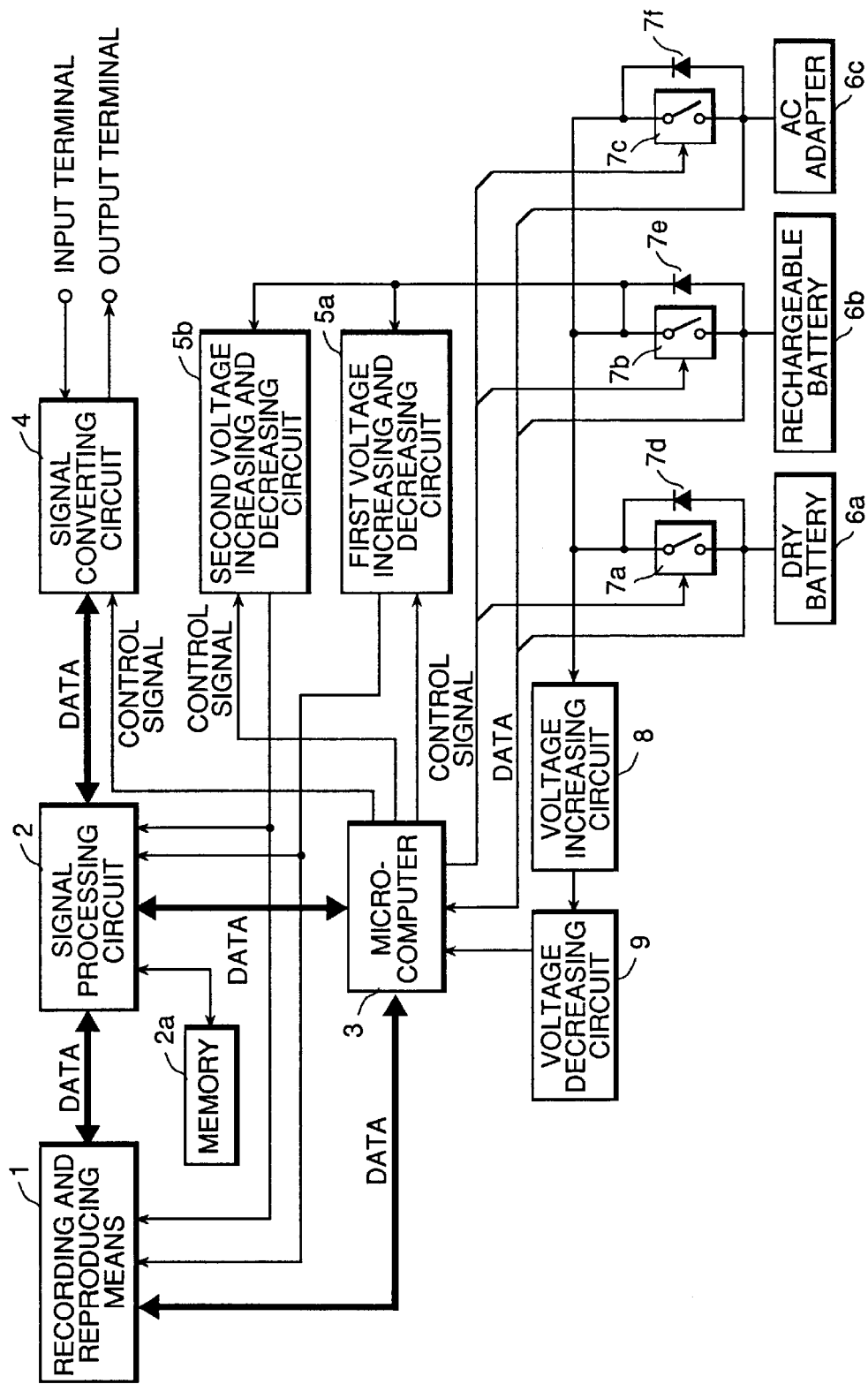
FIG. 1 is a schematic block diagram showing an electrical construction of a conventional disk drive.
Figure 2B:
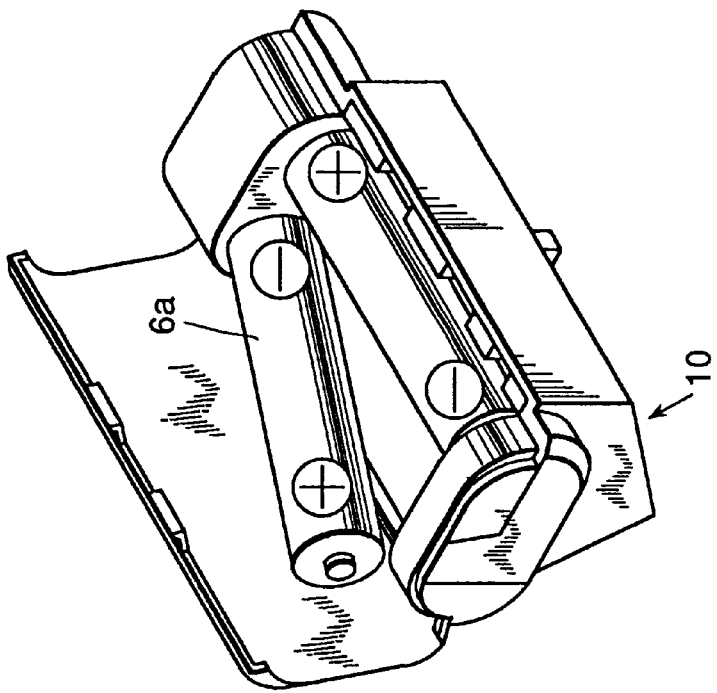
FIGS. 2A and 2B are external perspective views of a power supply unit used for the conventional disk drive of FIG. 1, where the unit is shown in the states before and after a dry battery is mounted therein respectively.
Figure 2A:
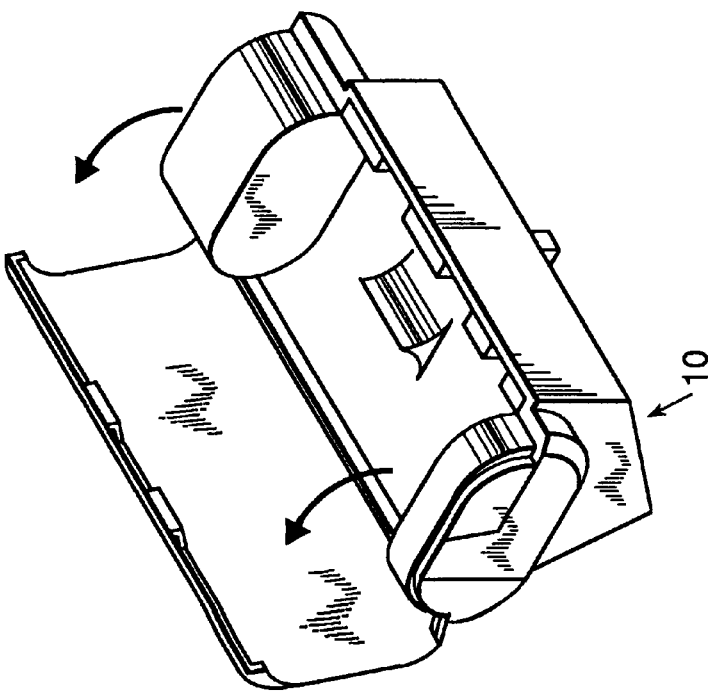
Figure 3:
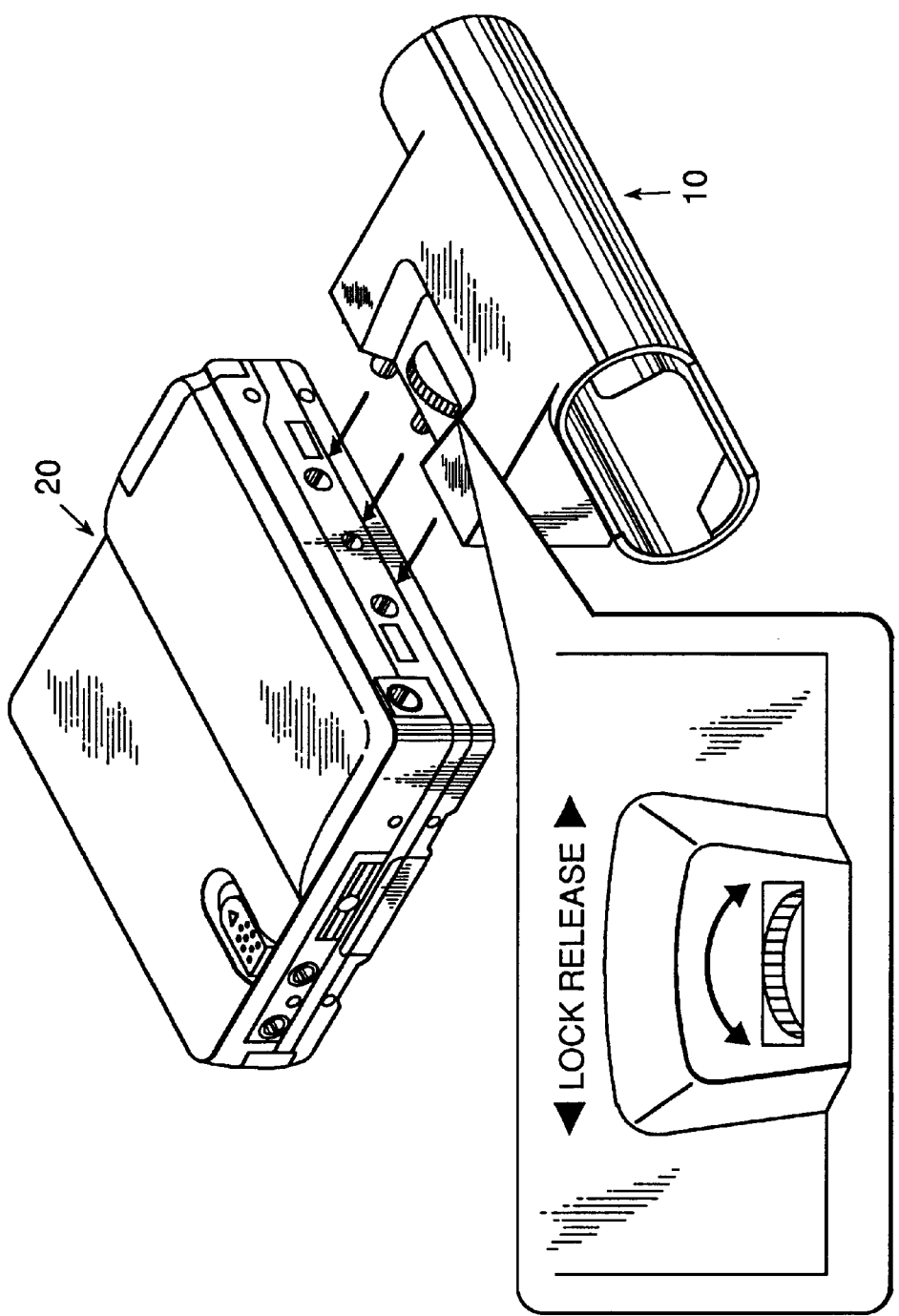
FIG. 3 is an external perspective view of a power supply unit when attaching it to a device body.

Referring to FIGS. 4 to 9, the disk drive according to an aspect of the present invention is described below. In FIGS. 4 and 6, components similar to those shown in FIGS. 1 to 3 are given the same reference numerals and will not be further explained.

In FIG. 4, numeral 11 designates a voltage increasing circuit composed of an up-type DC-DC converter, which is used for increasing the output voltage of a dry battery 6a to 3.4 volts and stops the voltage increasing operation with voltage of not less than 3.4 v applied to its output terminal. Numeral 12 denotes a choke coil having DC resistance of 0.2 ohms and inductance of 10 microhenry, which can decrease the output voltage of the voltage increasing circuit 11 by the DC resistance and absorb ripples produced by the voltage increasing circuit 11 by the reactance component. The voltage increasing circuit 11 and the choke coil 12 are accommodated in a battery case 10. The battery case 10 with a dry battery 6a mounted therein (as shown in FIG. 5B) is attached to the disk drive body 20 by fitting its male terminals in female terminals of the device body 20 as shown in FIG. 6. The choke coil 12 is electrically connected to the internal circuit of the device by turning a lock screw. The line from the dry battery 6a to the voltage increasing circuit 11 output has small resistance and assures a small power loss therein. The power loss due to the resistance in the circuit from the voltage increasing circuit 11 to the load is prevented by decreasing the current value therein. A total resistance of a circuit including the dry battery 6a, the voltage increasing circuit 11 and a choke coil 12 is larger than that of the rechargeable battery 6b by the influence of the DC resistance of the choke coil 12.

A diode 13 is provided for preventing the AC adapter 6c from being connected with reversed polarity and preventing the inflow of current from the rechargeable battery 6b. This diode 13 is connected at its output with the output of the choke coil 12.

A first voltage decreasing circuit 14a decreases the output voltage from the dry battery 6a through the choke coil 12 and the voltage increasing circuit 11 or the output voltage from the AC adapter 6c through the diode 13 to 2.5 volts and then supplies the 2.5V-voltage to users other than the microcomputer 3. A second voltage decreasing circuit 14b decreases the output voltage from the dry battery 6a through the choke coil 12 and the voltage increasing circuit 11 or the output voltage from the rechargeable battery 6b to 2.8 volts and then supplies the 2.8V-voltage to users other than the microcomputer 3. A third voltage decreasing circuit 15 decreases the output voltage from the dry battery 6a through the choke coil 12 and the voltage increasing circuit 11 or the output voltage from the rechargeable battery 6b or the output voltage from the AC adapter 6c through the diode 13 to 2.5 volts and then supplies the 2.5V-voltage to the microcomputer 3. Each of the voltage decreasing circuits 14a, 14b and 15 is composed of a down type DC-DC converter that is inexpensive and has a small power-loss property. The output voltages of all the power sources exceed the preset values of the voltage converter circuits 14a, 14b and 15. This is achieved by increasing the output voltage of the single dry battery 6a by the voltage increasing circuit 11.

The dry battery 6a, the rechargeable battery 6b and the AC adapter 6c are used within the ranges of 0.6V to 1.5V, 3.0V to 4.1V and 3.8V to 5.5V respectively. The rechargeable battery 6b possesses the charging and discharging characteristics shown in FIG. 7, whose output voltage is 4.1V in full charged state and gradually decreases with a decrease of the capacity until the remaining capacity is about 1 to 3% of the full charged capacity. Then, its output voltage sharply drops. The output voltage of the rechargeable battery 6b before the capacity reduces to 1–3% is somewhat higher than the output voltage of the voltage increasing circuit 11. An average output voltage may be estimated at 3.6V.

The dry battery 6a, the rechargeable battery 6b and the AC adapter 6c transmit power voltage data directly to the microcomputer that in turn determines the respective output voltage levels and compares the measured values with the preset warning value and the preset life-end value, then generates a warning signal or a command for stopping the writing or reading operation.

The essential feature of the above-mentioned construction of the disk drive according to the present invention is that the disk drive does not use power switches that are expensive and may cause a large power loss and dose not use an up-down type DC-DC converter that may cause a large power loss.

The operation of the disk drive when recording data on a disk medium is as follows:

When the user turns on a start key (power switch), the third voltage decreasing circuit 15 is powered by one of the power sources and the microcomputer 3 is then turned on. The microcomputer 3 causes a focus servo and a tracking servo to align themselves, reads a TOC (Table Of Contents) and waits for user's instruction. In this instance, the power supply for energizing the microcomputer 3 is determined as one of the power sources attached to the disk drive, i.e., a power supply has the largest output voltage.

Accordingly, the AC adapter 6c is used by the first priority if it is attached to the disk drive. When the rechargeable battery 6b is also attached to the disk drive and its output voltage is lower than 4.1 volts, it is also charged with power by the AC adapter. When the rechargeable battery 6b has the output voltage higher than 4.1 volts, the AC adapter supplies the power to the disk drive only. When the output voltage of the AC adapter decreases, the output voltage of the rechargeable battery 6b also decreases and cannot have the output voltage higher than that of the AC adapter 6c. Therefore, the battery charger 6b can not be selected when the AC adapter 6c is attached to the disk drive.

When the disk drive is disconnected from the AC adapter 6c and connected with the rechargeable battery 6b and the dry battery 6a, the rechargeable battery 6b is selected to use on the condition its output voltage is higher than 3.4 volts to which the output voltage of the dry battery 6a can be increased by the voltage increasing circuit 11. If not, the dry battery 6a is selected as the power supply of the disk drive and also supplies electrical power to the rechargeable battery 6b. When the rechargeable battery 6b is charged and has the output voltage of about 3.4 volts, it is also used together with the dry battery 6a to power the drive disk.

Now, the user operates a writing start key (not shown) on the disk drive in the state the microcomputer 3 is energized. The focus servo and tracking servo are automatically adjusted and the TOC is read, then the disk drive starts the writing operation. An analog audio signal is input through an input terminal to a signal converting circuit 4 by which it is converted to a digital signal and is then transferred to a signal processing circuit 2. The digital signal is compressed to about ¼ by the signal processing circuit 2 and stored in a memory 2a. Then, the compressed signal stored in the memory 2a according to the memory capacity is read out, modulated by a magnetic field and recorded on a disk from a magnetic head and a pickup. At this time, the pickup composing recording and reproducing means 1 has to heat a recording portion on the disk (not shown) to or higher than the curie point. An increased load is thus applied to the power supply.

As described before, the data is compressed to ¼ and recorded. This produces a dead time for which the pickup and the magnetic head are not needed to work. Namely, the pickup acts 1 second and halts 3 seconds. The laser beam for the pickup is stopped and the pickup servo and drive circuits are also stopped to save the power consumption. For example, the power consumption while the pickup operates is 800 mW whereas the power consumption while the pickup halts is 200 mW. Consequently, a large load and a light load are alternately applied to the power supply circuit. The power consumption while the pickup works for reproducing the record is 600 mW whereas the power consumption while the pickup halts is 200 mW.

When the disk drive with a dry battery 6a and the rechargeable battery 6b (without the AC adapter 6c) records data on the disk, the rechargeable battery 6b having the output voltage higher than 3.4 volts obtained at the voltage increasing circuit is selected as the power supply of the disk drive and supplies the output power to a heavy load when the pickup moves and a light load when the pickup halts. The remaining charge in the rechargeable battery 6b is reduced and the output voltage of the battery charger becomes lower than 3.4 volts at the output of the voltage increasing circuit 11. At this time, the power voltage increased to 3.4 volts by the voltage increasing circuit 11 is supplied through a choke coil 12 to respective voltage decreasing circuits 14a, 14b and 15. The output voltage of the choke coil 12 is also supplied to the rechargeable battery 6b when it is higher than the output voltage of the rechargeable battery 6b. The rechargeable battery 6b is thus recharged and then its output power together with the output power (3.4V) of the dry battery 6a through the voltage increasing circuit 11 is supplied to the respective voltage decreasing circuits 14a, 14b and 15 when the pickup operates and the heavy load is applied.

When the disk drive is provided with only the dry battery 6a and the rechargeable battery 6b (without AC adapter 6c) and records data on the disk, the dry battery 6a or rechargeable battery 6b is selected. When the disk drive provided with the AC adapter 6c, the AC adapter is necessarily used independent of any other power supply attached to the device. In this instance, if the AC adapter 6c is eventually pulled out or the power supply is interrupted, another power supply attached to the disk drive can instantly begin the supply of the electrical power to the disk drive since no selector switch is provided. The microcomputer is thus protected from falling into the hang-up or dead-halt state.

The disk drive can be powered by both the dry battery 6a and the rechargeable battery 6b. This feature offers the following constructional advantages:

First, the dry battery 6a is used when the rechargeable battery 6c is in the almost exhausted state. As described before, the rechargeable battery 6c has a steep curve of the capacity-to-output relation when the charge is almost consumed. This means that the output voltage of the battery sharply drops with a small discharge and can promptly arise when the battery is slightly recharged.

Second, a circuit formed by the dry battery 6a, the voltage increasing circuit 11 and the choke coil 12 has a total resistance larger than a total resistance of the rechargeable battery 6b. This is achieved by the effect of the DC resistance of the choke coil 12.

Third, the output voltage of the dry battery 6a can be increased to 3.4 volts even if it drops with an increase in the internal resistance.

Now it is supposed that the pickup acts and the load is heavy. In this instance, a current flowing from the rechargeable battery 6b is larger than a current flowing from the dry battery 6a because the resistance of the dry battery 6a is larger than that of the rechargeable battery 6b. Therefore, the rechargeable battery 6b takes on itself to supply the power to a larger part of the increasing load. The discharge of the rechargeable battery 6a increases as the load increases. Namely, a larger part of an increase in the load is applied to the rechargeable battery 6b. This allows the dry battery 6a to work with the slightly increased load.

The dry battery 6a and the rechargeable battery 6b are used together to supply the power to the increased load. When the load becomes light, the dry battery 6a still serves as the power supply to the device and the rechargeable battery 6b also supplies the power of decreased output voltage because its capacity was consumed by the increased load. In this instance, the output voltage of the dry battery 6a also decreases with increased internal resistance but is maintained at the level of 3.4 volts by the voltage increasing circuit 11 as mentioned before as the second advantage. With the light load, the current is small and the voltage drop across the choke coil 12 is also small. The output potential of the choke coil 12 is higher than that of the rechargeable battery 6b, thereby the rechargeable battery 6b can be charged until its output voltage increases to about 3.4 volts. The voltage increasing circuit 11 repeats voltage increasing of the dry battery 6a until the latter reaches the end of its service life. In other words, the dry battery 6a serves as the power supply for the device with the light load and at the same time charges the rechargeable battery 6b. The rechargeable battery 6b restores the initial level output and supplies the power to the device when the load becomes heavy. The above described steps will be repeated.

The key points of the above-described operation of the dry battery 6a in combination with the rechargeable battery 6b are as follows:

1. The power loss of the rechargeable battery 6b due to the internal resistance is considerably smaller than the power loss of the dry battery 6a due to the internal resistance thereof. While the load is light, the power from the dry battery 6a is partly stored in the rechargeable battery 6b and then spent when the load becomes heavy. The rechargeable battery thus restores the output voltage that is twice greater than that of the dry battery 6a. Therefore, the rechargeable battery 6b can supply the power at a twice smaller current as compared with the dry battery 6a. Consequently, the power loss due to the internal resistance of the rechargeable battery 6b is very small as compared with that of the dry battery 6a. On the other hand, the current in the dry battery 6a cannot largely increase under the increased load, therefore the power loss due to the internal resistance of the dry battery 6a cannot largely increase under the increased load. In other words, the power loss of the dry battery 6a increases not sharply but slightly from the level of the power loss caused under the light load.

When the dry battery 6a not in combination with the rechargeable battery 6b is used as a single power supply to the disk drive, it has to supply by itself the power to the increased load and produces, therefore, a large current flowing therein, causing an increased power loss. In this case, the dry battery 6a has a larger increase in its internal resistance as compared with the case when it has been used in combination with the rechargeable battery 6b and suffers a considerably increased power loss. This certainly shortens the service life of the dray battery 6a.

2. As the rechargeable battery 6b also supplies the power to the device with an increased load, the dry battery 6a is less loaded and may have a decreased life-end voltage. When the dry battery 6a is used solely as a single power supply, it must work under the heavy load and cannot therefore have the decreased life-end voltage.

The considerable elongation of the service life of the dry battery 6a was achieved by adopting the above-described two technical solutions. The service life of the dry battery 6a used solely for supplying the power to the disk drive for continuously recording data on a disk was about 1 hour whereas the service life of the dry battery 6a when it was used in combination with the rechargeable battery for the same purpose was about 3 hours, i.e., it could be used 3 times longer in practice. FIG. 8 shows a typical voltage-time relationship for a power supply consisting of the dry battery 6a and the full charged rechargeable battery 6b, which was obtained by the experiment on how long the disk drive could continuously record data on a disk being powered from the combination of the dry battery 6a and the full charged rechargeable battery 6b. The curves in FIG. 8 show that the gradual dropping of the output voltage of the rechargeable battery 6b took place with the elapse of about 7 hours after the beginning of the experiment and discharge of the dry battery 6a began a further half-hour past thereafter. Then, the dry battery 6a continued discharging to power the load and charge the rechargeable battery 6a for about three hours. Consequently, the dry battery 6a ended its life with the elapse of about 11 hours after the beginning of the experiment. The use of the dry battery 6a in combination with the rechargeable battery 6b thus realized the continuous data recording for about 11 hours. In contrast, the use of the dry battery 6a (without the rechargeable battery) for the same experiment allowed only one-hour recording of the data on a disk. Namely, the life of the dry battery 6a could be threefold elongated by using the dry battery 6a in combination with the rechargeable battery 6b.

For reproducing records from a disk by the disk drive, the power supply circuit operates in the similar way as described before for recording the data on the disk by the disk drive. FIG. 9 shows the results of an experiment on continuous reproducing data held on a disk by the disk drive with the dry battery 6a and the rechargeable battery 6b. In this instance, the output voltage of the rechargeable battery 6b began dropping just before about 11 hours elapsed and the dry battery 6a started discharging just before 12 hours elapsed from the beginning of the experiment. The dry battery 6a then continued discharging to supply the power to the disk drive with an increased load and recharge the rechargeable battery 6b during the operation under the light load. The dry battery reached the end of its life with an elapse of about 22 hours after the beginning of the experiment. The application of the combination of the dry battery 6a and the rechargeable battery 6b thus realized the long-term continuous reproducing of the data held on the disk.

On the contrary, the experiment with the disk drive provided with the dry battery 6a only (without the rechargeable battery) could achieved 8-hour continuous reproducing of information held on a disk (whereas the dry battery 6a operated for about 10.4 hours in the former experiment). Namely, the life of the dry battery 6a could be elongated by the factor of 1.3 by using it in combination with the rechargeable battery 6b. The experimental results indicate that the larger load increases the effect of elongating the life of the dry battery 6a.

Although the embodiment is described as using the rechargeable battery 6b as the first DC power supply having a recharging facility and the dry battery 6a as the second DC power supply having higher internal resistance than the first DC power supply, it must be understood that the present invention is not limited to the above and allows the first DC power supply to be any one having a recharging facility and the second DC power supply to be a rechargeable dry battery or other primary battery.

The embodiment has been described by way of example as a disk drive for writing data on a disk and reading the data held on the disk by repeating an action-and-halt cycle of a pickup. However, the disk drive may not periodically repeat the action-and-halt of the pickup. Furthermore, the present invention is not limited to the disk drive and may be applied to any kind of devices having a widely variable power-consuming load. It is also possible to modify the embodiment in which two kinds of batteries are effectively combined in such a way that the dry battery is used as a main power supply and the rechargeable battery has a capacity reduced in accordance with a time ratio between an increased load period and a decreased load period, i.e., the dry battery has the capacity to supply the power required by the decreased load and the combination of the rechargeable battery and the dry battery has the capacity to supply the power required by the increased load. The reduction in the capacity or volume of the rechargeable battery makes it possible to make further improvement in regard to the space ratio of the battery in the device and the service life of the battery. The rechargeable battery can be made as an essential (unremovable) circuit component incorporated in the device.

As described above, the power supply circuit and the disk drive including the power supply circuit according to an aspect of the present invention can offer the following advantageous features:

The power required by the load is supplied basically from the second DC power supply utilizing the power supplied from the first DC power supply having small internal resistance, which is featured by a very small power loss than the power loss caused if the second DC power supply is used only without the first DC power supply. This can considerably improve the output power factor. The power required by the increased load is supplied by both the first and second DC power sources, by which the second DC power supply is considerably lightened in its burden as compared with the burden when it works solely and can have a very small preset value of its life-end voltage. This eliminates the possibility of replacing the second DC power supply having a large remaining charge, elongating the service life of the power supply.

The power supply circuit does not require switching over the power sources in supplying the power to the load. This can eliminate the possibility of hanging-up of the microcomputer even when one power supply is suddenly disconnected and the next designated power supply has a least voltage near the life-end level. There is no need to use a very expensive power switch such as a power MOSFET switch. The power supply circuit can thus be manufactured at a low cost and has a power saving feature.

The power supply circuit according to another aspect of the present invention can reduce the burden of the first DC power supply during the operation under the increased load and can remove the ripple components produced when increasing the output voltage of the first DC power supply. The power supply circuit can be thus manufactured at a reduced cost and can obtain a saved space factor.

The power supply circuit according to another aspect of the present invention can almost entirely use the charge in the first DC power supply before shifting by the second DC power supply and can instantly increase the output voltage of the first DC power supply even for a short period of the light load. The power supply circuit can make a full use of the power accumulated in the first DC power supply and adapted to operate under increased and decreased loads alternating at a short interval.

The power supply circuit according to another aspect of the present invention uses, in the voltage converting circuits for obtaining a preset load voltage, a voltage decreasing circuit (not voltage increasing and decreasing circuit) to improve the power saving property of the circuitry.

The disk drive according to another aspect of the present invention can reduce a value of current flowing in a power transmission line from the power supply unit to the load, preventing the power from being lost in the line with an increased current. This effectively protects the second DC power supply against shortening of its life when used in the power supply unit.

What is claimed is:

1. A power supply circuit for supplying electric power to a widely variable power-consuming load, comprising a first DC (direct-current) power supply having a recharging facility and a second DC power supply having an internal resistance higher than that of the first DC power supply, wherein the power supply circuit is provided with a voltage increasing means for increasing an output voltage of the second DC power supply to a specified value, a DC resistance is disposed between the voltage increasing means and the load, the first DC power supply is connected directly to a connection point between the DC resistance and the load, and the first DC power supply is capable of supplying a voltage higher than a voltage increased by the voltage increasing means.

2. A power supply circuit as defined in claim 1, wherein the DC resistance is composed of a coil having DC resistance.

3. A power supply circuit as defined in claim 1, wherein the first DC power supply has a property showing a sharp change in its output voltage according to a charging power in a state just before consuming all a charge and the voltage increasing means increases the output voltage of the second DC power supply to a level even with the output voltage of the first DC power supply in the state just before consuming all the charge therein.

4. A power supply circuit as defined in claim 2, wherein the first DC power supply has a property showing a sharp change in its output voltage according to a charging power in a state just before consuming all a charge and the voltage increasing means increases the output voltage of the second DC power supply to a level even with the output voltage of the first DC power supply in the state just before consuming all the charge therein.

5. A power supply circuit as defined in any one of claims 1, 2, 3 or 4, wherein the first DC power supply is capable of supplying a voltage higher than a load voltage required by the load and the voltage increasing means is capable of increasing the output voltage of the second DC power supply higher than a load voltage required by the load.

6. A disk drive device capable of storing data in and retrieving data from disk media by repeating move-and-pause operation of a pickup, comprising a first DC power supply having a recharging facility and a second DC power supply having an internal resistance higher than that of the first DC power supply and a voltage increasing means for increasing an output voltage of the second DC power supply to a specified value and a DC resistance disposed between the voltage increasing means and a pickup driving circuit, wherein the first DC power supply is connected directly to a connection point between the DC resistance and the pickup driving circuit, and the first DC power supply is capable of supplying a voltage higher than the voltage increased by the voltage increasing means.

7. A disk drive device as defined in claim 6, wherein the second DC power supply and the voltage increasing means form a separate power-supply unit that can be detachably attached to the disk drive device.

* * * * *